July 26, 1960  C. J. FITCH  2,946,954
INDICATOR

Filed Jan. 28, 1957  2 Sheets-Sheet 1

INVENTOR
CLYDE J. FITCH
BY
his ATTORNEYS

July 26, 1960

C. J. FITCH 2,946,954

INDICATOR

Filed Jan. 28, 1957

CURVE A – CURRENT VS POTENTIAL OF MERCURY DROP.
CURVE B – SURFACE TENSION CURVE OF MERCURY DROP.

INVENTOR.
CLYDE J. FITCH

BY
his ATTORNEYS.

United States Patent Office 2,946,954
Patented July 26, 1960

2,946,954
INDICATOR

Clyde J. Fitch, Endicott, N.Y., assignor to International Business Machines Corporation, New York, N.Y., a corporation of New York Filed Jan. 28, 1957, Ser. No. 636,616

2 Claims. (Cl. 324—97)

This invention relates to electrical indicator devices, especially those that operate responsive to low voltage electrical impulses.

In the design and construction of electrical circuits, it has been customary to use neon tubes as indicator devices. However, neon tubes have the disadvantage that they require relatively high voltages, of the order of about 90 volts, in order to operate.

An object of the invention is to provide an improved low voltage visual indicator.

Another object is to provide an improved low current visual indicator.

Another object is to provide a visual indicator which may be operated on a voltage of the order of 1 to 3 volts and therefore may be advantageously used in transistor circuits.

Still another object of the invention is to devise a visual indicator which is compact and may be economically utilized.

The visual indicator of the present invention comprises an electrical cell having a chamber in which there are mounted an anode and a cathode, the chamber being designed to hold and retain a liquid. The cell chamber also contains a drop of a second liquid, such as mercury, which is insoluble in the first liquid. The drop is adapted to be held by surface tension on the cathode. When an electrical potential is applied across the anode and cathode, or when the intensity of the potential is changed, this produces a change in the surface tension of the drop, thereby causing the mercury drop to change its position on the cathode. A light source is mounted on one side of the cell, which is adapted to pass light through the cell in a predetermined path. The light path is so disposed that the movement of the drop of liquid, responsive to the change in potential, changes the amount of light from the light source which passes in the light path. By the arrangement described, the change in light intensity may be observed or measured as an indication of the change in potential applied across the cathode and anode. Since the change in surface tension, with the resulting change in the position of the drop, may be made responsive to low voltages of the order of 1 to 3 volts, it follows that the electric cell-type device described may be used as a visual indicator for electrical pulses in low voltage circuits such as transistorized circuits.

The invention may be understood more fully by reference to the drawings, considered together with the following description.

Figure 1:
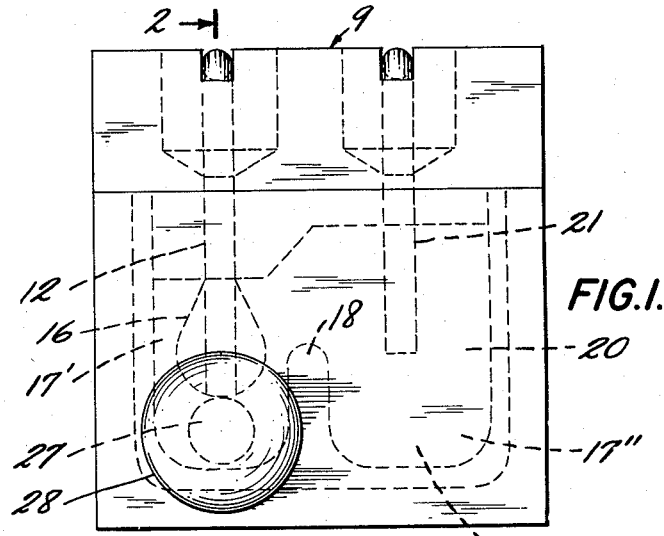
Figure 1 is a front elevation view of the indicator cell.
Figure 2:
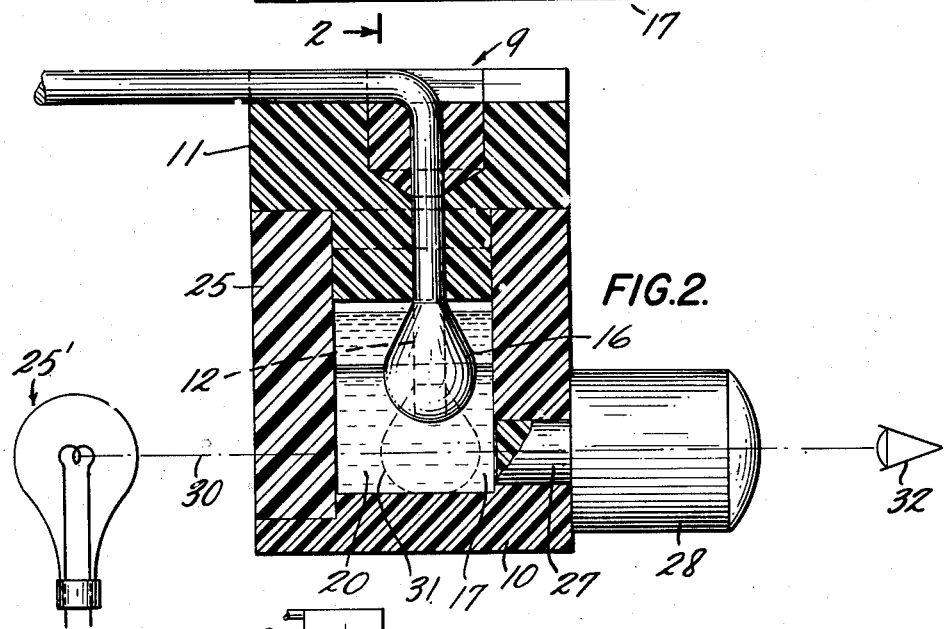
Figure 2 is a side elevation view of the cell in section taken in a plane indicated by the line 2—2 on Figure 1 and looking in the direction of the arrows.

Referring first to Figures 1 and 2 which illustrate certain structural features of the cell per se and of its operation, a cell casing 10, which may for example be organic plastic or glass, is provided with a tightly fitting cap 11 which may be joined to the casing with cement, by welding, or by another type of sealed joint. A cathode 12 is formed by a wire which is embedded in the cap 11. The cathode 12 is wetted in the mercury at the lower end and holds a drop of mercury thereon. The cell chamber 17 is divided into two portions, a cathode chamber 17′ and a communicating anode portion 17″, separated by a dam 18. Within the cell chamber 17 is a solution of an electrolyte 20, which may for example be an aqueous solution of an inorganic salt as described in greater detail hereinafter. A positive electrode or anode 21 extends through the cap 11 and is embedded therein. On one side of the cell is a source of light 25′ which is transmitted through a clear Lucite window 25. The casing 10 should be opaque. A window 27 is formed in the opposite side of the casing 10 and light from the source 25′ passing through the cell 9 emerges through the window 27 to be transmitted to a viewer by a Lucite rod 28. In dotted lines at 31 there is indicated the position of the mercury drop when the electrical potential is such that the surface tension of the mercury drop 16 has been decreased, causing the mercury drop to fall to the position indicated, still, however, retained by cathode 12. Preferably, the cylindrical light path is small enough, and the mercury drop 16 is large enough, so that in the lower position 31, the mercury drop completely obstructs the path 30. An observer at 32, therefore, may readily note the change in electrical potential by the change in the intensity of the light in the path 30.

The liquid 20 may be a solution of an electrolyte and preferably such a solution that will not cause gas to evolve at the electrode when an electrical potential is applied. If an electrolyte is used which will produce appreciable amounts of gas, then a suitable vent adjacent the roof of the cell, not shown in the drawings, is provided. Preferably such a vent is of small dimensions, so as to prevent the escape of liquid while still permitting the escape of gas. Preferably a wetting agent is added to the aqueous solution to decrease its surface tension and thereby increase the difference in surface tension between the cell liquid and the mercury drop. An example of an electrolyte solution which may be used in indicator cells is as follows:

|  | G. |
|---|---|
| Potassium chloride | 50.0 |
| Disodium phosphate | 30.5 |
| Citric acid | 2.5 |
| p-Quinone | 0.025 |
| Hydroquinone | 0.025 |
| "Triton NE" [1] | 0.05 |
| Distilled water to make one liter. (pH=7.1–7.4) | |

[1] An aryl alkyl polyether alcohol.

Non-aqueous highly polarized organic solvents, such as N,N-dimethylformamide containing quaternary ammonium salts, also might be employed for the electrolyte. The container used with these solvents must be of a material, such as glass, that will not be attacked or dissolve into the solution.

The size and material of the cathode wire are of significance in that the size will have a bearing on the location of the upper and lower positions of the mercury drop, and an inert material will be desirable to minimize corrosion. Metallic platinum has been found to afford the requisite corrosion resistance. A base metal of lower cost may be coated with platinum. It has also been found that an iron or nickel wire may be wetted with the mercury to provide a cathode having the requisite resistance to corrosion. The cathode may be wetted by the mercury by passing current through the cell with the mercury drop charged negatively and in contact with the electrode. Satisfactory cells have been made and operated having a cathode made of wire of 0.025" diameter.

The construction and material of the anode are of importance mainly from the standpoint of selecting a material which is inert under the conditions prevailing in the cell. Platinum has been found to meet the requirements. The platinum wire anode may have a diameter of 0.010 inch. However, larger wires may be used if cost will permit.

The size of the mercury drop is of importance since the action of the indicator cell hinges on the balance between the weight of the mercury and its surface tension; that is, the higher the surface tension the higher the position the mercury will tend to assume in its raised position, whereas the greater the weight of the drop the lower the position the mercury will tend to assume in its raised position. With a 0.025-inch diameter wire cathode, it has been found that a satisfactory size for the mercury drop is 0.052 gram, which corresponds with a drop diameter of 0.071 inch. It is preferred that the cell be constructed so that the lowermost end of the cathode wire will just touch the top of the mercury drop when the latter is resting on the bottom of the cell. With an 0.25-inch diameter cathode wire cut off square and a mercury drop having a weight of 0.052 gram, the lower end of the wire should be spaced about 0.055–0.062 inch from the bottom of the cell. In the cell shown in Figures 1 and 2, the cathode portion 17' of the cell is 0.106 inch (Fig. 1) by 0.125 inch (Fig. 2) by 0.150 inch high, and the distance of the lower end of the cathode from the bottom of the cell chamber is 0.055 inch, while the other dimensions are to scale. With this construction, the mercury in measured amount and the cell liquid may be added to the cell through an aperture not shown, after which the aperture is sealed. The mercury then will fall to the bottom of the cell and form a drop which will be in contact with the lower end of the cathode so as to be picked up and held by the cathode, generally in the raised position, when there is no potential applied across the cell.

Figure 4:
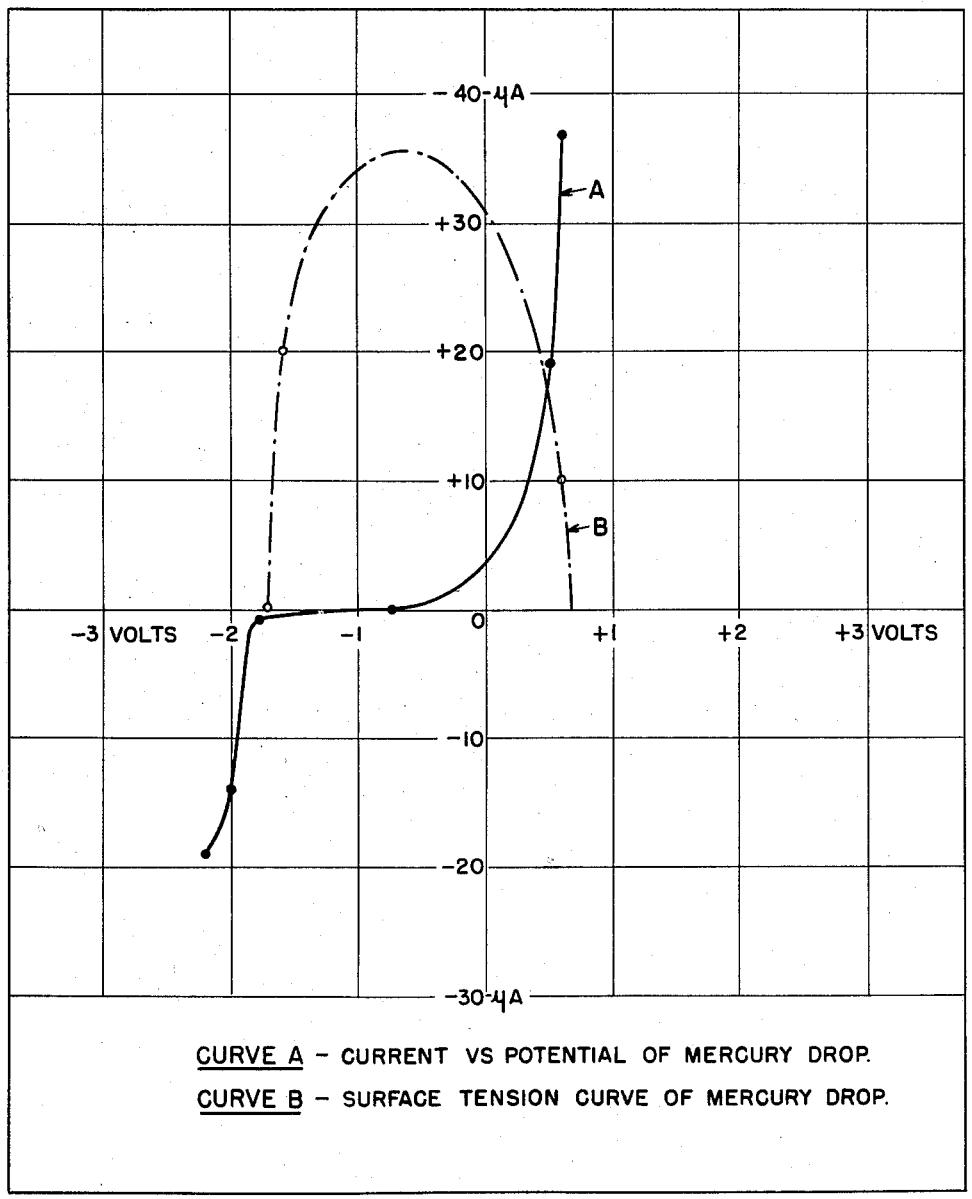
Figure 4 is a graph illustrating the performance characteristics of a particular electrolytic cell.

In Figure 4 there is illustrated graphically the current in microamperes (shown as the ordinate) which may be produced by the application of a given potential in volts (shown as the abscissa) between the anode and cathode of a cell, using an aqueous electrolyte of the type exemplified above. The latter relationship is shown in curve A of Figure 4. Curve B, shown as a broken line, represents a typical surface tension versus voltage relationship for the mercury drop. The higher points on the parabolic surface tension curve will produce an elevated position of the drop, whereas the lower points represent conditions under which the mercury drop will assume the lower position on the cathode. It will be noted from Figure 4 that at zero potential there will be a finite current through the cell, produced by the tendency of the mercury to react in the presence of the electrolyte. The potential corresponding with a zero current is about −1 volt. Accordingly, the indicator cell of the invention is preferably biased with a negative charge of about 1 volt on the cathode to prevent excessive chemical reaction between the mercury and electrolyte.

At a negative potential of about −1.5 volts, the surface tension begins to decrease rapidly. Between about −1.5 and −2.5 volts, the surface tension of the mercury is low, while the current flow in microamperes is still not excessive. Hence, the signal voltage applied to the indicator cells of the invention is preferably in the approximate range −1.5 to −2.25 volts, including the −1 volt bias. The current leakage corresponding with the voltage range indicated will be substantially less than 100 microamperes, generally about 5 to 20 microamperes.

Although in the specific illustration of the indicator cell of the invention the signal was produced by interruption of the path of light by the mercury drop, if desired the signal may be produced by light reflected from, rather than interrupted by, the mercury drop, namely, by viewing the drop.

Figure 3:
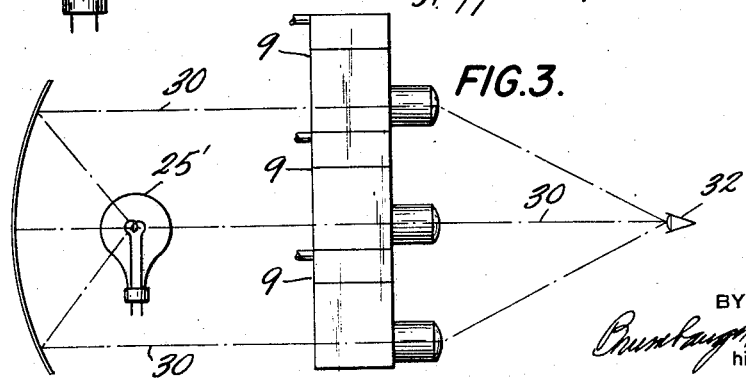
Figure 3 shows an assembly of several of the cells and how a single light source may be used for all.

Figure 3 illustrates an assembly of indicator cells of the type shown in detail in Figures 1 and 2. With this assembly a single source of light will suffice for a plurality of cells. The cells may be arranged to represent a number or a group of numbers or any other required information.

Although specific embodiments of the invention have been described herein, it will be apparent to those skilled in the art that there are many modifications and equivalents within the scope of the teaching of the application. Accordingly, it is intended that all such modifications and equivalents be included within the scope of the appended claims.

I claim:

1. A voltage indicating electrolytic cell comprising an enclosing casing of non-conducting material enclosing a cell chamber filled with liquid capable of conducting an electric current, a first electrode formed of conducting material extending through said non-conducting casing and having its inner end in contact with said liquid, said inner end having a drop of mercury suspended therefrom and held thereon by surface tension, a second electrode also extending through said non-conducting casing and into contact with said liquid but mounted out of contact with said first electrode, said chamber having a floor portion adapted to hold said drop adjacent to said inner end of said first electrode, the distance between the bottom of the first electrode and said floor being less than the vertical diameter of the drop so that the first electrode will touch and pick up the drop when the drop is resting on said floor, a light source on one side of said cell adapted to pass light through the cell in a predetermined path so disposed that movement of said drop will change the amount of light from said source passing through said cell in said path, and means for applying a potential across the electrodes thereby to cause the drop to change its position with respect to the first electrode caused by changing the surface tension of said drop and thereby to change the amount of light from said source passing through said cell and said path, the drop being adapted to resume its original position on said first electrode when said applied potential is removed.

2. The cell as described in claim 1 in which the first electrode is the cathode, the second electrode is the anode, and the liquid is a polar electrolyte solution.

References Cited in the file of this patent

UNITED STATES PATENTS

| 1,871,361 | Curtis | Aug. 9, 1932 |
| 1,942,027 | Hindle | Jan. 2, 1934 |
| 2,343,885 | Coleman | Mar. 14, 1944 |

OTHER REFERENCES

Publication, "Text-Book of Electrochemistry," by S. Arrhenius, published by Longmans, Green and Co., New York, 1902, pages 232, 233 relied on.